Aug. 9, 1960     L. R. PADBERG, JR., ET AL     2,948,879
HIGH POWER SHORT PULSE TRANSMITTING APPARATUS
Filed April 27, 1955     3 Sheets-Sheet 3
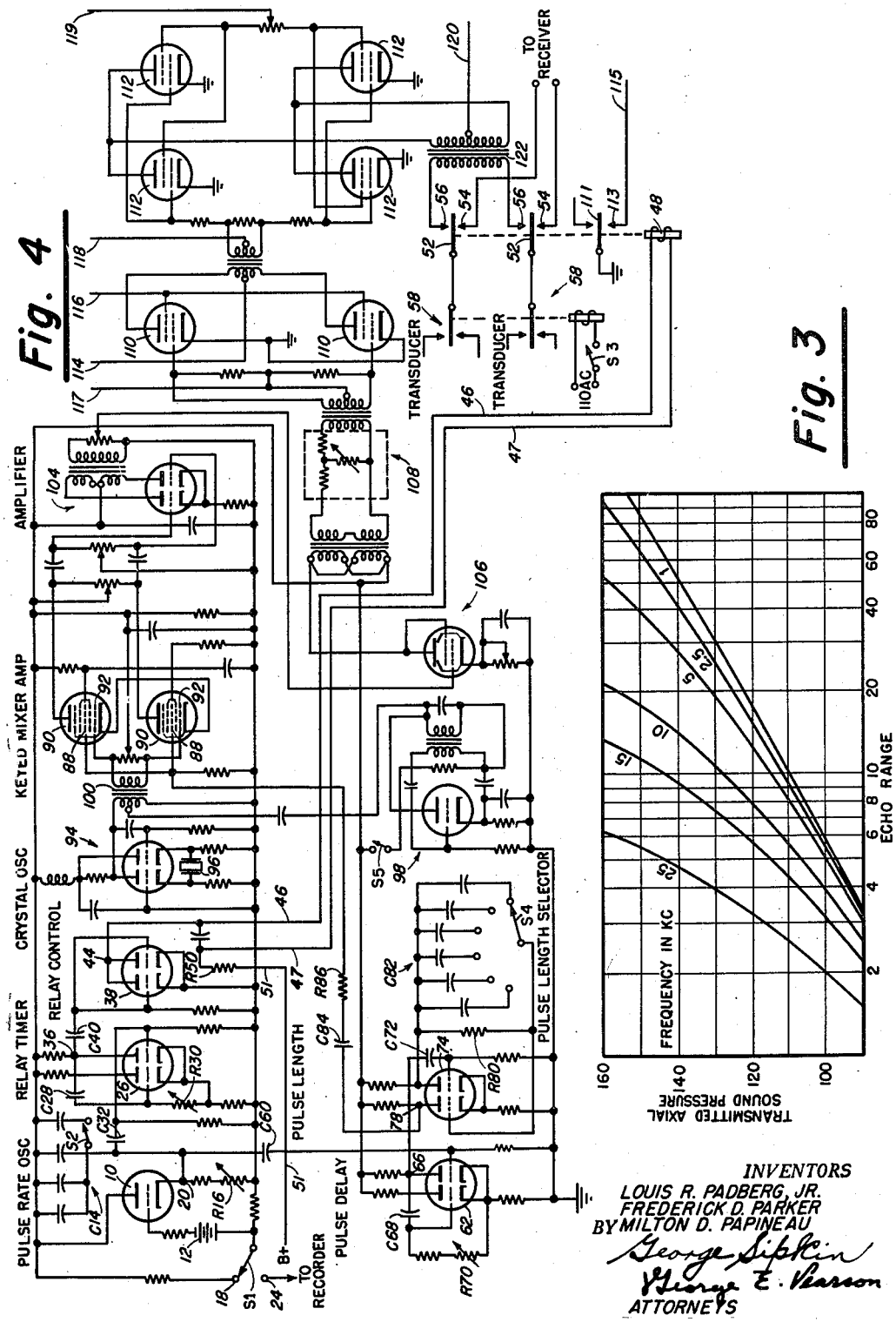
INVENTORS
LOUIS R. PADBERG, JR.
FREDERICK D. PARKER
BY MILTON D. PAPINEAU
ATTORNEYS United States Patent Office
2,948,879
Patented Aug. 9, 1960

2,948,879

HIGH POWER SHORT PULSE TRANSMITTING APPARATUS

Louis R. Padberg, Jr., 4126 Middlesex Drive, San Diego 16, Calif.; Frederick D. Parker, 3784 Brems St., San Diego, Calif.; and Milton D. Papineau, 2303 Cecilia Terrace, San Diego 10, Calif.

Filed Apr. 27, 1955, Ser. No. 504,391

13 Claims. (Cl. 340—1)

(Granted under Title 35, U.S. Code (1952), sec. 266)

The invention described herein may be manufactured and used by or for the Government of the United States of America for governmental purposes without the payment of any royalties thereon or therefor.

This invention relates to an acoustic echo ranging system and more particularly to an apparatus for generating short high power pulses of fixed frequency.

Acoustic echo ranging equipment or Sonar comprises an electro-mechanical transducer for converting electrical energy to acoustic energy and vice versa, an electrical energy pulse generator, means for receiving echo pulses converted by the transducer and a transmit receive switch for alternately coupling the transducer with the receiver and with the generator. Because the transducer and particularly a magnetostrictive transducer with a high ratio of reactance to resistance is a highly resonant device it will operate most efficiently at the single frequency for which it is designed. Most Sonar systems employ oscillators which are keyed only at the time of pulse transmission. This mode of operation together with the inherent tendency of such oscillators to drift or vary in frequency yields a pulse having poor frequency stability. Furthermore, it has been common to determine the length of the transmitted pulse by the closure time of the transmit receive switch whereby the shape and length of the transmitted pulse is distorted by the bounce time of the switch contacts and other characteristics of the mechanical operation of such contacts which will vary during extended periods of use. This arrangement renders impossible the transmission of uniform pulses of extremely short duration because of the physical inertia of the switch elements.

The system of this invention comprises a pulse generator for generating a train of gating pulses of predetermined length, a crystal stabilized oscillator, means for mixing the output of said oscillator with said pulse train to produce a train of signal pulses of fixed length and frequency, a timing generator for generating a train of timing pulses of greater length than said signal pulse length for cyclically operating a trans-receive relay, means for triggering both said pulse generator and said timing generator at a desired repetition rate, and means for delaying said gating pulses relative to said timing pulses whereby the signal pulse is initiated after completion of the bounce time of the switch contacts and is terminated before the switch shifts from its transmit position.

It is an object of the invention to provide means for generating a pulse which can be most efficiently utilized by a resonant transducer.

It is a further object of this invention to provide means for generating pulses of a frequency which does not vary during the pulse period.

Another object of this invention is the provision of means for generating a low frequency pulse of uniform rectangular wave shape.

Still another object of this invention is to provide a generator of pulses of short and selectively variable length.

A still further object of this invention is the provision of means for operating a transmit receive switch which enables the transmission of exceedingly short pulses.

Another object of this invention is the provision of means for operating a transmit receive switch which will effectively circumvent pulse distortion due to characteristics of the switch.

Other objects and many of the attendant advantages of this invention will be readily appreciated as the same becomes better understood by reference to the following detailed description when considered in connection with the accompanying drawings wherein:

Fig. 3 is a graph indicating the relation of frequency, power and range of acoustic ranging equipment; and Fig. 4 is a circuit diagram of portions of one embodiment of this invention.

In the drawings similar reference characters refer to similar parts.

A review of prior sonars shows why their performances were limited and why certain parameters had to be changed to provide the probability of a marked increase in range capability. For example, frequencies in the region of 25 kc. had been selected. This choice had been made for several reasons but primarily because 25 kc. was outside the aural spectrum and offered a semblance of security and it was an acceptable compromise between the opposing factors of attenuation coefficient, where losses increased with frequency, and angular resolution where directivity of a transducer increased with frequency. Pulse lengths of at least 50 milliseconds were used because the ear had a good response to these lengths and because pulses of these lengths resulted in Doppler effect from a moving target that could be easily recognized. Sonars which developed source levels of about 108 db above one dyne per square centimeter at one meter were classed as "heavyweight." This source level usually required electrical power input of between 400 and 600 watts.

With these parameters as a reference, Fig. 3 illustrates the range of probable detection of a target. Experience at sea has shown the agreement of theory with practice. Following the 25 kc. curve we see that to extend the range from 2.5 to 5, for example, the source level must be increased some 35 db. While this may not be impossible, it is impractical. Although increasing the power and shortening the pulse length will increase the performance of high frequency equipment, it is certainly not the best answer to increased range capability. Theory would recommend a decrease in operating frequency as the initial step toward obtaining greater ranges. Reference to the lower frequency curves in Fig. 3 will show the expected magnitude of such improvement. Note, for example, that a decrease in frequency should provide an increased range capability equivalent to a very large increase in power level.

Figure 1:
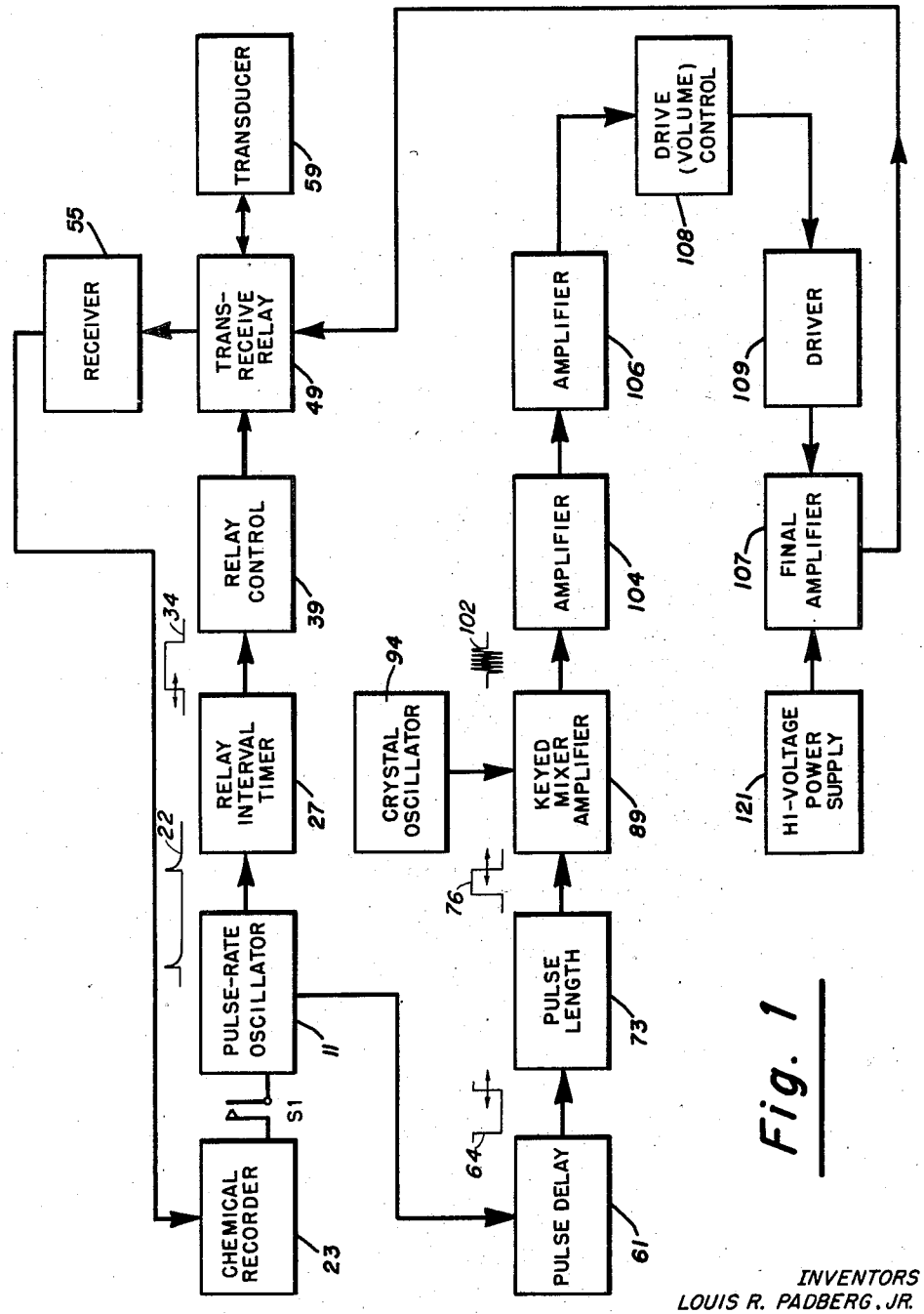
Fig. 1 is a block diagram of one echo ranging apparatus in which the present invention may be incorporated.

Referring to the apparatus schematically shown in Fig. 1, a transmit receive relay 49 which alternately couples the magnetostrictive or piezoelectric transducer 59 with the receiver 55 and with the final amplifier 107 is timed and controlled by the relay control 39 and relay interval timer 27, the latter being triggered together with the pulse delay stage 61 by the pulse rate oscillator 11. The pulse rate oscillator 11 may itself determine a selectively variable pulse repetition rate or, with switch S1 closed, be triggered by the cyclical movement of a recorder 23 stylus which may actuate a micro switch in the oscillator circuit. The pulse delay stage 61 keys the pulse stage 73 the output of which gates the keyed mixer amplifier 89 to permit passage therethrough of the output of the fixed frequency crystal oscillator 94 in the form of a train of fixed frequency signal pulses 102 of length determined by the pulse length stage 73 and recurring at a rate determined by the pulse rate oscillator 11. The signal pulses amplified by the two amplifiers 104 and 106 are fed through the drive control 108 and driver stage 109 to the final amplifier 107 which obtains its plate voltage from the variable hi-voltage power supply 121. The signal pulses 102 are fed from the final amplifier 107 to the transducer 59 through the transmit receive relay 49 and are timed to arrive at the relay shortly after the latter has been shifted to the position wherein it couples the final amplifier 107 with the transducer 59 which converts the signal pulses 102 to transmitted acoustic energy pulses. With the transmit receive relay 49 in position for coupling the transducer 59 with the receiver 55, the transducer 59 receives acoustic energy echoes of transmitted pulses, converts these echoes to electrical energy pulses and sends the latter through the receiver 55 to the recorder 23 and such other echo display devices as may be desired.

Referring now to the schematic circuit diagram of Fig. 4, the pulse rate oscillator circuit 11 which includes tube 10, battery 12, variable capacitance C14 and variable resistor R16, may be internally excited when manually operated switch S1 connects to terminal 18 to provide at pin 20 a series of sharply peaked pulses 22 (Fig. 2) at a repetition rate which may be varied by manually changing R16 and C14. The latter is varied by operation of switch S2. Alternatively, when S1 is connected to terminal 24, the oscillator circuit is externally excited by the recorder 23 which cyclically closes a micro switch (not shown) to supply through S1 pulses of positive voltage of greater amplitude than the voltage of battery 12 from a source (not shown). In this instance, the pulse repetition rate is determined by the speed of the recorder 23 which is varied for the several range scales. The relay interval timing is effected by a cathode coupled monostable multivibrator which includes tube 26, capacitor C28 and variable resistor R30. The application of a pulse 22 via coupling capacitor C32 to one grid of tube 26 initiates the timing pulse 34 (Fig. 2) which appears at terminal 36 and is of a length determined by the variable time constant of C28 and R30. Timing pulse 34 is coupled by capacitor C40 to the grids of relay control tube 38 which produces at pin 44 the control pulse 42 which is fed via conductor 46 to the coil 48 of the transmit receive relay 49. The coil returns via lead 47 through resistor R50 and the unregulated plate supply of tube 38 furnished through lead 51. Energization of the coil closes contacts 52, 54 (receive position) to couple a preselected transducer 59 with the receiver and upon deenergization of the coil contacts 52 are urged toward contacts 56 whereby the transducer 59 is coupled with the final amplifier 107 and the apparatus is in transmit position.

Two transducers of different resonant frequencies (such as 10 kc. and 15 kc.) are provided and are selectively coupled with the transmit receive switch by operation of change over relay 58 which may be energized by closing switch S3.

Trigger pulse 22 is also applied by capacitor C60 to one grid of tube 62 of the pulse delay multivibrator 61 and thus determines the time of initiation of delay pulse 64 which appears at pin 66. The trailing edge of the delay pulse is determined by the selectively variable time constant of capacitor C68 and variable resistor R70. Pulse 64 is fed through capacitor C72 to one grid of tube 74 of the pulse length multivibrator 73 and determines the time of initiation of the gating pulse 76 which appears at pin 78. The length of this gating pulse is determined by the time constant of resistor R80 and selected capacitance C82, the value of the latter being selectively variable by manual operation of pulse length selector switch S4 to provide pulses of 0.1, 0.3, 1.0, 3.0, 10 and 150 milliseconds, respectively. The gating pulse 76 is coupled through capacitor C84 and resistor R86 with one control grid 88 of each of tubes 90 of the keyed mixer amplifier to place these tubes in condition to conduct upon the application of a positive signal 91 to control grids 92 thereof. This positive signal of fixed frequency is supplied to grids 92 by the free-running cathode coupled crystal oscillator circuit 94 which is frequency stabilized by an easily changeable piezoelectric crystal 96 with the circuit operated at the fundamental crystal frequency. Of course there is chosen a crystal having a resonant frequency which is identical with the resonant frequency of the selected transducer.

When the pulse length multivibrator 73 is set to provide gating pulses of relatively long duration (of the order of 100 milliseconds or more) it is possible to amplitude modulate the signal 91 of fixed frequency (such as 10 kc. or 15 kc.) at an audio frequency on the order of 800 cycles to permit aural presentation of the echo. This modulation is supplied to the crystal oscillator through the primary of coupling transformer 100 by an audio frequency oscillator 98 which may be disconnected by switch S5 when pulse lengths on the order of 10 milliseconds or less are transmitted.

It will be seen that the keyed mixed amplifier 89 passes the fixed frequency signal 91 when gated by pulse train 76 to provide an output in the form of a train of signal pulses 102 of frequency determined by the crystal oscillator of length determined by the pulse length multivibrator 73, at a delay time determined by the pulse delay multivibrator 61 and at a repetition rate determined by the trigger pulse 22. Signal pulse train 102 is successively fed through amplifiers 104, 106 to manually variable drive or volume control 108, an impedance match attenuator, which is one of several power controls. Control 108 governs the amplitude of the signal train which excites the control grids of tubes 110 of the driver stage 109.

To prevent leakage of the fixed frequency signal 91 through mixer tubes 90 when the transmit receive switch is in receive position, there are chosen for the mixer stage 89 tubes 90 having a low grid to plate capacitance at the free-running oscillator frequency. For the same reason, tubes 110 of the driver 109, a pair of beam power tetrodes 110 operated in class B in transmit position, may be biased at approximately double cutoff in receive position by the closing of contacts 111, 113 of the relay which grounds lead 115 of the bias source (not shown) of these tubes.

The plate, screen and grid bias voltages of tubes 110 are supplied via leads 114, 116, and 117 respectively from a source (not shown). The control grid and screen grid of each tube 112 of the final amplifier 107 are supplied through conductors 118, 119 respectively from a source (not shown) with a voltage which is manually adjustable between zero and an amount on the order of minus 1 kv. for the grid and between zero and plus 1.2 kv. for the screen, while the hi-voltage power supply 121 (Fig. 1) feeds a voltage which is manually variable from zero to an amount on the order of 15 kv. to the plates of tubes 112 through lead 120 and the primary winding of final output transformer 122.

The amplified signal pulse train from the plates of driver tubes 110 is fed to the control grids of tubes 112 and appears on the plates of these tubes with the desired power whence it is fed through transformer 122 and arrives at the proper time in the switch cycle as a series of preformed fixed frequency pulses of well defined rectangular wave shape.

The apparatus shown will supply a short pulse (on the order of one millisecond) to the transducer 59 at a power level up to 140 kilowatts; a value greatly in excess of the 600 watts supplied to transducers of the previous so-called "high power" sonar systems. With this power and pulse length a 10 or 15 kilocycle magnetostrictive transducer has been observed in the disclosed apparatus to produce an axial level of sound of 137 db above one dyne per square centimeter at a distance of one meter as compared with the 108 db above one dyne per square centimeter at one meter produced by prior apparatus.

Figure 2:
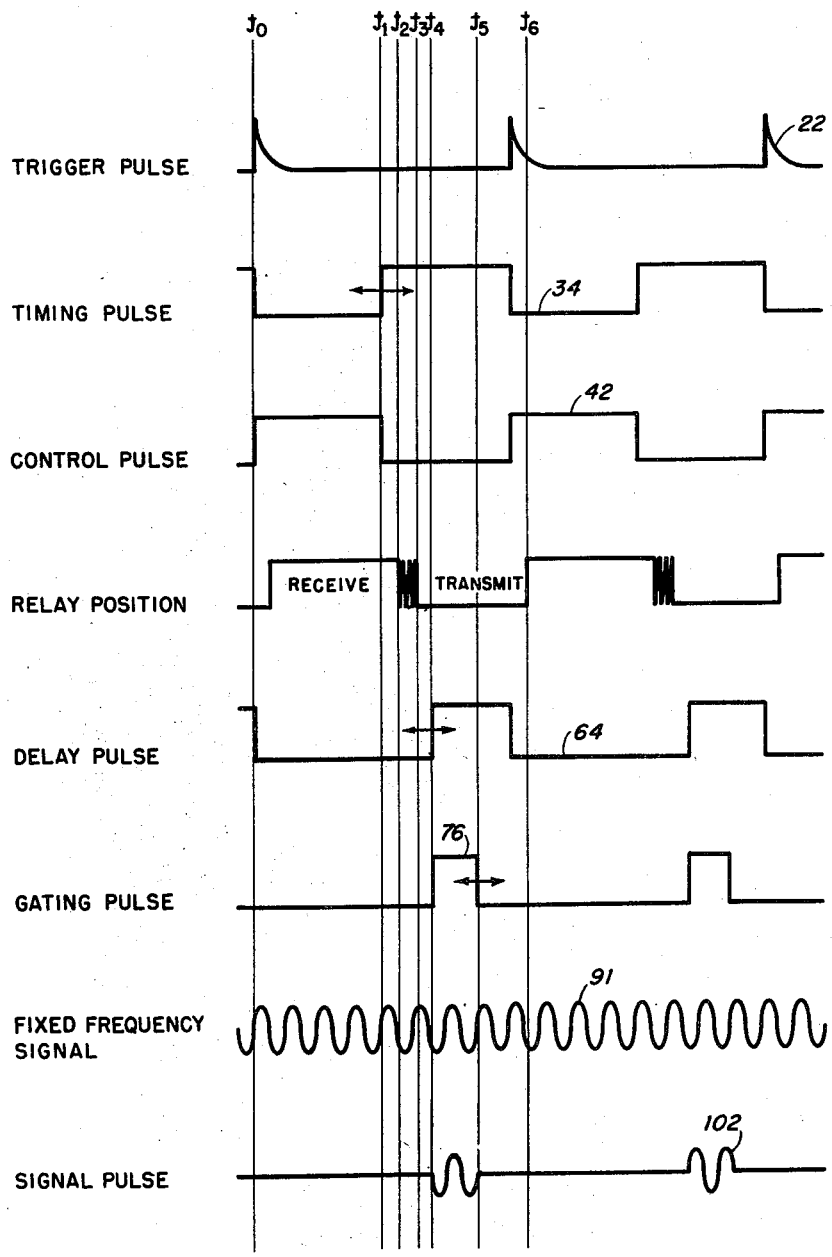
Fig. 2 is a timing and wave form chart.

Referring now to Fig. 2, the trigger pulse 22 recurs at the pulse repetition rate which is selected by either the recorder speed or switch S2. The initiation of each negative timing pulse 34 and of each positive control pulse 42 coincides with each trigger pulse and occurs at time $t_0$. Adjustment of R30 determines the duration of pulses 34 and 42 for an interval $t_0$—$t_1$, which is the duration of energization of relay coil 48 and constitutes the delay time of the timing pulses. Time interval $t_1$—$t_2$ represents the lag time between the energization or de-energization of the coil and the closing of the switch contacts. At time $t_1$ the relay coil 48 is de-energized and contact between elements 52 and 56 is initially effected by the spring return of element 52 at time $t_2$ to place the switch in transmit position. This initial contact, however, is not efficient since the resiliency of the contact points will cause them to bounce or move relative to each for a time interval $t_2$—$t_3$ and considerable arcing across the points would occur if the pulse were applied at this time. Therefore signal pulse 102 the delay time or initiation of which is determined by the time of rise of delay pulse 64 is timed to arrive at contacts 56 at a time $t_4$ after time $t_3$ when a stable contact has been effected. In order to maintain the performed rectangular wave shape of the pulse 102 the transmit receive switch is maintained in transmit position until time $t_6$ which is later than the time $t_5$ at which the pulse 102 is terminated. At time $t_6$ the apparatus is again in receive position and the cycle recommences.

Obviously many modifications and variations of the present invention are possible in the light of the above teachings. It is therefore to be understood that within the scope of the appended claims the invention may be practiced otherwise than as specifically described.

What is claimed is:

1. A transmitter comprising a transducer having a predetermined resonant frequency and generator means coupled with said transducer for supplying signal pulses of said frequency and at a predetermined repetition rate, said generator means including a free running crystal stabilized oscillator, means for generating a train of gating pulses at said predetermined repetition rate, means for modulating the output of said oscillator with said gating pulses to produce said signal pulses, means for generating a train of timing pulses at said repetition rate and of a length greater than the signal pulse length, and switching means controlled by said timing pulse for connecting the signal pulse train to the transducer after the timing pulse has been initiated whereby a stabilized frequency signal pulse free from switching distortions is provided.

2. A transmitter comprising a transducer having a predetermined resonant frequency, a pulse forming stage, a free running oscillator stage for developing a signal pulse including crystal means for stabilizing the frequency thereof at said resonant frequency, means controlled by said pulse forming stage for producing a timing pulse of a length greater than said signal pulse, means for selectively controlling the length of the pulses produced by said pulse forming stage and switching means controlled by said timing pulse for connecting the signal pulse train to the transducer after the timing pulse has been initiated whereby a stabilized frequency signal pulse free from switching distortions is provided.

3. A pulse generator comprising means for generating a train of pulses of predetermined length at a pulse repetition rate, crystal means for generating a continuous fixed frequency signal, means for mixing said pulses with said signal to produce a train of fixed frequency signal pulses of said predetermined length at said repetition rate, a transducer, means for coupling said transducer to said mixing means, and means for controlling said coupling means to avoid transient distortion of said signal pulse train by said coupling means.

4. A pulse generator comprising means for generating a train of pulses of predetermined length at a pulse repetition rate, crystal means for generating a continuous fixed frequency signal, means for passing said signal in signal pulses of said predetermined length at said repetition rate, a transducer resonant at said fixed frequency, switch means operable in one position to pass said signal pulses to said transducer, means for cyclically moving said switch means to said one position at said repetition rate for a length of time greater than said predetermined length, and means for delaying said signal pulses relative to the initiation of the movement of said switch means to said one position.

5. A transmitter comprising pulse means for generating a train of pulses of predetermined length, means for triggering said pulse means at pulse repetition rate, oscillator means for generating a continuous signal of fixed frequency, said oscillator means including piezoelectric means for stabilizing the frequency of said signal, mixing means comprising an electron tube having first and second control grids, means coupling said pulse train and said continuous signal to said first and second control grids respectively to cause the output of said mixing means to comprise a train of signal pulses of said fixed frequency having a length equal to said pulse length and occurring at said pulse rate, a transducer having a resonant frequency equal to said fixed frequency, and means for applying said train of signal pulses to said transducer.

6. A transmitter comprising pulse means for generating a train of pulses of predetermined length, means for triggering said pulse means at pulse repetition rate, oscillator means for generating a continuous signal of fixed frequency, said oscillator means including piezoelectric means for stabilizing the frequency of said signal, mixing means comprising an electron tube having first and second control grids, means coupling said pulse train and said continuous signal to said first and second control grids respectively to cause the output of said mixing means to comprise a train of signal pulses of said fixed frequency having a length equal to said pulse length and occurring at said pulse rate, a transducer having a resonant frequency equal to said fixed frequency, means for generating a train of timing pulses at said repetition rate and of length greater than said signal pulse length, switch means controlled by said timing pulses for coupling said mixing means with said transducer, and means for delaying said signal pulse train relative to said timing pulse train.

7. In a device of the class described, means for generating a signal of predetermined duration, a transducer, electronic means for coupling said generating means with said transducer, control means for energizing said electronic means to couple said generating means and transducer for a longer time than said signal duration and means for delaying the initiation of said signal with respect to the initiation of said coupling.

8. In a device of the class described, means for generating a fixed frequency signal of predetermined duration, a transducer resonant at said frequency, electronic means for coupling said generaating means with said transducer, control means for energizing said electronic means to couple said generating means and transducer for a longer time than said signal duration and means for delaying the initiation of said signal with respect to the initiation of said coupling, said delay time being less than the dfference between said coupling time and said signal duration whereby said signal is terminated before the termination of said coupling.

9. In a device of the class described, pulse means for generating a train of pulses of predetermined length at pulse repetition rate, a transducer, switch means coupling said pulse means with said transducer, control means for cyclically closing said switch means at said pulse rate for a period of time greater than said pulse length, means for delaying said pulse train relative to the initiation of the closing of said switch means, and means for selectively varying the length of said pulse.

10. In a device of the class described, crystal stabilized pulse means for generating a train of fixed frequency pulses of predetermined length at pulse repetition rate, a transducer resonant at said fixed frequency, switch means for coupling said pulse means with said transducer, control means for cyclically closing said switch means at said pulse rate for a period of time greater than said pulse length, and means for delaying said pulses relative to the initiation of the closing of said switch means.

11. In a device of the class described, means for generating a train of gating pulses of predetermined length at a predetermined pulse repetition rate, free running crystal stabilized oscillator means for generating a continuous signal of fixed frequency, mixing means for mixing said gating pulses and said continuous signal to produce a train of fixed frequency signal pulses of said predetermined length at said repetition rate, a transducer resonant at said fixed frequency, switch means for coupling said mixing means with said transducer, control means for cyclically closing said switch means at said repetition rate for a period of time greater than said pulse length, and means for delaying the start of said gating pulses relative to the initiation of the closing of said switch means.

12. An acoustic energy transmitting and receiving apparatus comprising pulse means for generating a train of signal pulses of predetermined length, means for triggering said pulse means at pulse repetition rate, means controlled by said triggering means for generating a train of timing pulses of length greater than said signal pulse length, means for delaying said signal train relative to said timing train, a transducer, a receiver, switch means for alternately coupling said transducer with said receiver and said signal pulse generating means, operator means controlled by said timing pulse train for actuating said switch means to initiate the coupling of said signal pulse generating means with said transducer before the initiation of a corresponding signal pulse and to terminate said last mentioned coupling after the termination of said corresponding signal pulse.

13. An acoustic energy transmitting and receiving apparatus comprising gating means for generating a train of gating pulses of predetermined length, means for triggering said gating means at pulse repetition rate, oscillator means for generating a continuous signal of fixed frequency, crystal means for stabilizing the frequency of said oscillator, mixing means coupled with said gating means and with said oscillator means for generating a train of fixed frequency signal pulses of said predetermined length at said repetition rate, means controlled by said triggering means for generating a train of timing pulses of length greater than said signal pulse length, means for delaying said timing pulse train, means for delaying said signal pulse train relative to said timing pulse train, a transducer resonant at said fixed frequency, a receiver, switch means for alternately coupling said transducer with said receiver and with the output of said mixing means, said switch means controlled by said timing pulse train whereby said transducer is coupled to said mixing means before the initiation of a corresponding signal pulse and uncoupled from said mixing means after the termination of said corresponding signal pulse.

References Cited in the file of this patent
UNITED STATES PATENTS

| | | |
|---|---|---|
| 1,738,565 | Claypoole | Dec. 10, 1929 |
| 2,280,226 | Firestone | Apr. 21, 1942 |
| 2,315,733 | Pfleger | Apr. 6, 1943 |
| 2,458,415 | Peterson | Jan. 4, 1949 |
| 2,460,316 | Trent et al. | Feb. 1, 1949 |
| 2,500,638 | Krauth | Mar. 14, 1950 |
| 2,566,858 | Sebring | Sept. 4, 1951 |
| 2,594,732 | Cork | Apr. 29, 1952 |
| 2,780,795 | Ambrosio | Feb. 5, 1957 |
| 2,806,949 | Smith | Sept. 17, 1957 |